(12) United States Patent
Maruta (10) Patent No.: US 7,286,800 B2
(45) Date of Patent: Oct. 23, 2007

(54) MULTI-BEAM ANTENNA RECEPTION DEVICE AND MULTI-BEAM RECEPTION METHOD

(75) Inventor: Yasushi Maruta, Tokyo (JP)

(73) Assignee: NEC Corporation, Tokyo (JP)

( * ) Notice: Subject to any disclaimer, the term of this patent is extended or adjusted under 35 U.S.C. 154(b) by 127 days.

(21) Appl. No.: 10/538,762

(22) PCT Filed: Dec. 10, 2003

(86) PCT No.: PCT/JP03/15786

§ 371 (c)(1),
(2), (4) Date: Jun. 10, 2005

(87) PCT Pub. No.: WO2004/054121

PCT Pub. Date: Jun. 24, 2004

(65) Prior Publication Data

US 2006/0063566 A1    Mar. 23, 2006

(30) Foreign Application Priority Data

Dec. 12, 2002    (JP) .............................. 2002-360823

(51) Int. Cl.
H04B 1/00    (2006.01)
H04B 15/00    (2006.01)

(52) U.S. Cl. ...................... 455/63.4; 455/455; 455/465; 455/500; 342/368; 342/375; 342/378

(58) Field of Classification Search ............... 455/63.4, 455/450, 455, 465, 500, 502, 509, 513; 342/378, 342/375, 368, 382

See application file for complete search history.

(56) References Cited

U.S. PATENT DOCUMENTS

| 6,157,685 A | 12/2000 | Tanaka et al. |
| 6,385,181 B1* | 5/2002 | Tsutsui et al. .............. 370/335 |
| 2002/0024975 A1* | 2/2002 | Hendler ...................... 370/535 |

FOREIGN PATENT DOCUMENTS

| EP | 0849888 A2 | 12/1997 |
| JP | 10-190495 A | 7/1998 |
| JP | 11-266180 A | 9/1999 |
| JP | 2002-217779 A | 8/2002 |
| JP | 2002-290932 A | 9/2002 |
| JP | 2003-283394 A | 10/2003 |
| WO | WO 03/81805 A1 | 10/2003 |

* cited by examiner

*Primary Examiner*—Matthew Anderson
*Assistant Examiner*—Tuan Pham
(74) *Attorney, Agent, or Firm*—Sughrue Mion, PLLC (57) ABSTRACT

To provide a multibeam antenna reception device capable of improving the reception quality while suppressing an increase in the amount of computation. The multibeam antenna reception device includes a path detection control section (108) for controlling the path detection range at the current time for M receive beam path detection sections ($106_1$ to $106_M$) based on pairs of receive beam numbers and path delays detected prior to the current time and information on user signal reception quality in the pairs of the receive beam numbers and the path delays output from the M receive beam path detection sections ($106_1$ to $106_M$). When path detection is performed with respect to each user in the M receive beam path detection sections ($106_1$ to $106_M$), pairs of receive beam numbers and path delays and information on user signal reception quality in the pairs of the receive beam numbers and the path delays are detected according to the path detection range controlled by the path detection control section (108).

38 Claims, 4 Drawing Sheets

| PATH DELAY (UNIT: CHIP) | RECEIVE BEAM NUMBER (PEAK ANGLE) | | | | | | | | | | | |
|---|---|---|---|---|---|---|---|---|---|---|---|---|
| | 0 (−55) | 1 (−45) | 2 (−35) | 3 (−25) | 4 (−15) | 5 (−05) | 6 (+05) | 7 (+15) | 8 (+25) | 9 (+35) | 10 (+45) | 11 (+55) |
| 0.0 | | | | | | | | | | | | |
| 0.5 | | | | | | | | | | | | |
| 1.0 | | | | | | | | | | | | |
| 1.5 | | | | | | | | | | | | |
| 2.0 | | | | | | | | | | | | |
| 2.5 | | | | | | | | | | | | |
| 3.0 | | | | | | | | | | | | |
| 3.5 | | | | | | | | | | | | |
| 4.0 | | | | | | | | | | | | |
| 4.5 | | | | | | | | | | | | |
| 5.0 | | | | | | | | | | | | |
| 5.5 | | | | | | | | | | | | |
| 6.0 | | | | | | | | | | | | |
| 6.5 | | | | | | | | | | | | |
| 7.0 | | | | | | | | | | | | |
| 7.5 | | | | | | | | | | | | |
| 8.0 | | | | | | | | | | | | |
| 8.5 | | | | | | | | | | | | |
| 9.0 | | | | | | | | | | | | |
| 9.5 | | | | | | | | | | | | |
| 10.0 | | | | | | | | | | | | |
| 10.5 | | | | | | | | | | | | |

PATH DETECTION RANGE SET TO COVER ALL PATH DELAYS AND ALL RECEIVE BEAMS

MULTI-BEAM ANTENNA RECEPTION DEVICE AND MULTI-BEAM RECEPTION METHOD

TECHNICAL FIELD

The present invention relates to a multibeam antenna reception device and a multibeam reception method for suppressing other user interference by controlling the antenna directivity, and more particularly, to a multibeam antenna reception device and a multibeam reception method in which a pair of a path delay and a receive beam number is detected to determine the receive directivity from a plurality of fixed directional patterns (multiple beams).

BACKGROUND ART

In cellular mobile telephone systems and the like, with the aim of obtaining a high-speed and high-quality signal as well as increasing subscriber capacity, methods have been studied in which are formed, through the use of an array antenna reception device including a plurality of antenna elements, such directional patterns (beams) that cause the receive gain to increase for a direction from which a desired signal arrives and cause it to decrease for other directions. One of the methods is applied to a multibeam antenna reception device that selects a receive beam from a plurality of fixed directional patterns (multiple beams).

As an example of a conventional technique concerning the multibeam antenna reception device of this kind may be cited the one in which a receive beam with a delay path excellent in reception quality is selected from among a plurality of fixed receive beams for reception (see Patent Document 1).

In the following, the conventional multibeam antenna reception device will be described referring to FIG. 1.

Figure 1:
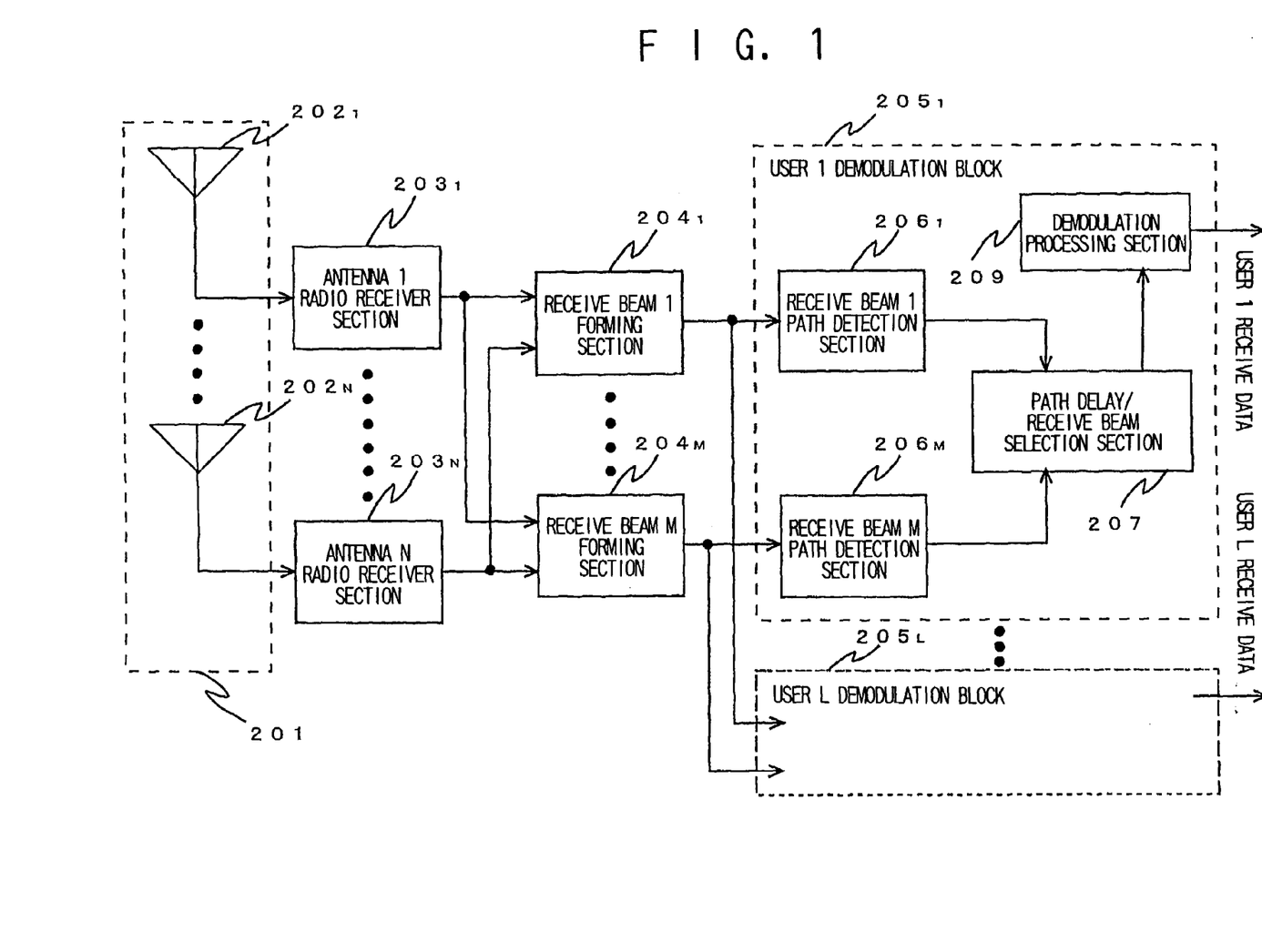
FIG. 1 is a block diagram showing an example of the construction of a conventional multibeam antenna reception device.

FIG. 1 is a block diagram showing an example of the conventional multibeam antenna reception device.

The conventional multibeam antenna reception device comprises: a receiving array antenna 201; antenna 1 to N radio receiver sections $203_1$ to $203_N$ corresponding to receiving antenna elements, respectively; receive beam 1 to M forming sections $204_1$ to $204_M$; and user 1 to L demodulation blocks $205_1$ to $205_L$.

The receiving array antenna 201 includes N (N: an arbitrary integer) pieces of the receiving antenna elements $202_1$ to $202_N$. The receiving array antenna 201 has no special limitation as to the directivity of the receiving antenna elements $202_1$ to $202_N$ as a unit in the horizontal plane and the vertical plane. The antenna element may be of, for example, omnidirectional (non-directional) or dipole (bidirectional) type. N pieces of the receiving antenna elements $202_1$ to $202_N$ are arranged in closely spaced relation so that signals received by the respective antenna elements correlate with one another. Incidentally, the receiving array antenna 201 has no special limitation as to the number of the receiving antenna elements and the arrangement thereof so long as N pieces of the receiving antenna elements $202_1$ to $202_N$ are placed in the vicinity to each other. The receiving antenna elements may be arranged linearly or circularly with a spacing of one-half of the wavelength of the carrier frequency.

A signal received by each of N pieces of the receiving antenna elements $202_1$ to $202_N$ contains a desired user signal component, a plurality of interference signal components and thermal noise. In addition, a plurality of multipath components are present in the respective desired user signal component and interference signal components. Generally, these signal components arrive from different directions. In other words, there exist plural pairs of receive beam numbers and desired user signal path delays.

Each of the antenna 1 to N radio receiver sections $203_1$ to $203_N$ comprises a low noise amplifier, a band-limiting filter, a mixer, a local oscillator, an AGC (Automatic Gain Controller), an quadrature detector, a low pass filter, an A/D (analog to digital) converter, and the like. Taking the antenna 1 radio receiver section $203_1$ as an example, the section $203_1$ receives as input the output of the receiving antenna element $202_1$. The antenna 1 radio receiver section $203_1$ performs amplification, frequency conversion from radio to baseband, quadrature detection, analog to digital conversion, etc. for the input signal, and thereafter, outputs the signal to the receive beam 1 to M forming sections $204_1$ to $204_M$.

The receive beam 1 to M forming sections $204_1$ to $204_M$ receive as input the output of the respective antenna 1 to N radio receiver sections $203_1$ to $203_N$. Each of the receive beam 1 to M forming sections $204_1$ to $204_M$ forms a different fixed receive beam for the input signal to output it to the user 1 to L demodulation blocks $205_1$ to $205_L$.

Incidentally, there is no special limitation on the number and shape of the fixed receive beam as well as the method of forming the beam. In terms of shape, an orthogonal multibeam may be cited as an example of the fixed receive beam. Besides, as an example of the method of forming the fixed receive beam may be cited digital beam forming in which respective input signals are multiplied by a fixed complex beam weight by digital computation to obtain the sum thereof.

Further, with reference to FIG. 1, the receive beam 1 to M forming sections $204_1$ to $204_M$ are arranged in the position subsequent to the antenna 1 to N radio receiver sections $203_1$ to $203_N$, and create beams for digital signals in the baseband. However, beam forming may be performed in the radio band with a Butler matrix.

The receive beam 1 to M forming sections $204_1$ to $204_M$ forms different fixed receive beams, respectively, for all input signals containing the user signal component and the user signal multipath components to separate the signals according to the directions from which they have arrived.

Each of the user 1 to L demodulation blocks $205_1$ to $205_L$ includes receive beam 1 to M path detection sections $206_1$ to $206_M$, a path delay/receive beam selection section 207, and a demodulation processing section 209.

In the following, the user 1 to L demodulation blocks $205_1$ to $205_L$ will be described by taking one of them, the user demodulation blocks $205_1$, as an example.

The user 1 demodulation block $205_1$ receives as input the output of the respective receive beam 1 to M forming sections $204_1$ to $204_M$, and outputs a user 1 transmission beam number and user 1 receive data.

The receive beam 1 to M path detection sections $206_1$ to $206_M$ receive as input the output of the receive beam 1 to M forming sections $204_1$ to $204_M$, respectively. Each of the receive beam 1 to M path detection sections $206_1$ to $206_M$ detects user 1 signal path delay with respect to each input signal to measure the reception quality of the user 1 signal in the path delay, thereby outputting the result to the path delay/receive beam selection section 207. At this point, the respective input signals have been multiplexed by the user 1 to L signals and also by the multipath components of the respective user signals caused by propagation delay.

Incidentally, there is no special limitation on the method of multiplexing the user signal, and such signal multiplexing techniques as TDMA (Time Division Multiple Access) and CDMA (Code Division Multiple Access) may be applied. Further, there is no special limitation on the method of separating multiplexed user signals, the method of detecting the path delay of the multipath components, and the number of path delays to be detected. Still further, there is no special limitation on the index of the reception quality to be measured and the measurement method. Examples of the reception quality index include received power and SIR (Signal to Interference Ratio).

Besides, the receive beam 1 to M path detection sections $206_1$ to $206_M$ may detect path delay and measure the reception quality of the user 1 signal in the path delay with only a known symbol (pilot symbol, etc.) of the user 1 signal.

The path delay/receive beam selection section 207 receives as input the output of the respective receive beam 1 to M path detection sections $206_1$ to $206_M$ including a pair of a receive beam number and a path delay, and information on user signal reception quality in the pair of the receive beam number and the path delay. Based on the user signal reception quality, the path delay/receive beam selection section 207 selects a pair of a receive beam number and a path delay for use in demodulation, and outputs the selected pair and information on the user signal reception quality in the pair to the demodulation processing section 209.

A variety of methods may be applied to select a pair of a receive beam number and a path delay for use in demodulation without special limitations. For example, the top A (A: an integer not less than 1) pair(s) excellent in reception quality or at most B (B: an integer not less than 1) pair(s) meeting a certain standard of reception quality may be selected.

The demodulation processing section 209 receives as input the pair of the receive beam number and the path delay and the information on the user signal reception quality in the pair of the receive beam number and the path delay output from the path delay/receive beam selection section 207. The demodulation processing section 209 performs demodulation based on the input receive beam number and path delay to output the user 1 receive data.

With the construction described above, the conventional multibeam antenna reception device selects a receive beam, in which a delay path excellent in reception quality exists, from among a plurality of fixed receive beams for reception, thereby being capable of forming such beams that cause the receive gain to increase for a direction from which a desired signal arrives and cause it to decrease for other directions.

[Patent Document 1]
Japanese Patent Laid-Open No. HEI 11-266228

PROBLEMS THAT THE INVENTION IS TO SOLVE

In the conventional multibeam antenna reception device having the above construction, however, an improvement in reception quality will involve increasing the amount of computation.

This is because a scan is performed over all path delays and all receive beams when a pair of a path delay and a receive beam is detected.

Therefore, in the conventional multibeam antenna reception device, if it is assumed that the resolution of the path delay and the number of receive beam numbers are doubled to improve the reception quality, the amount of computation for detecting a pair of a path delay and a receive beam quadruples: 2×2=4.

Besides, in a multipath environment, a user signal component contains a plurality of multipath components. Generally, these signal components arrive from different directions. Therefore, a pair of a path delay and a receive beam can be arbitrarily formed out of all path delays and receive beams. However, it is often the case that the propagation environment changes relatively slowly, and pairs of path delays and receive beams are unlikely to change drastically every detection period.

In the conventional multibeam antenna reception device, a scan is performed over all path delays and all receive beams including path delays and receive beams in which there is little possibility that a path is to be detected, and the computation for them is required. Accordingly, when the resolution of the path delay and the number of receive beam numbers are increased to improve the reception quality, the amount of computation increases quadratically.

It is therefore an object of the present invention to provide a multibeam antenna reception device and a multibeam reception method capable of improving the reception quality while suppressing an increase in the amount of computation.

DISCLOSURE OF THE INVENTION

To achieve the object mentioned above, the present invention is characterized as follows.

In accordance with the present invention set forth in claim 1, there is provided a multibeam antenna reception device comprising: a receiving array antenna including N (N: an integer not less than 1) receiving antenna elements; N radio receiver sections corresponding to the receiving antenna elements, respectively; M (M: an integer not less than 1) receive beam forming sections; and L (L: an integer not less than 1) user demodulation blocks, wherein, at the time of the detection of a path defined by a pair of a receive beam number as an arrival direction and a path delay as arrival timing with respect to the multipath of each user, the path detection range at the current time is controlled based on information on paths detected prior to the current time.

In accordance with the present invention set forth in claim 2, in the multibeam antenna reception device according to claim 1, each of the user demodulation blocks includes M receive beam path detection sections for detecting path delay with respect to each user from the outputs of the M receive beam forming sections, a path delay/receive beam selection section for selecting one or more pairs of receive beam numbers and path delays for use in demodulation based on pairs of receive beam numbers and path delays and information on user signal reception quality in the respective pairs of the receive beam numbers and the path delays output from the M receive beam path detection sections, a demodulation processing section for performing demodulation with the one or more pairs of the receive beam numbers and the path delays selected by the path delay/receive beam selection section, and a path detection control section for controlling the path detection range at the current time for the respective M receive beam path detection sections based on pairs of receive beam numbers and path delays detected prior to the current time and information on user signal reception quality in the respective pairs of the receive beam numbers and the path delays output from the M receive beam path detection sections.

In accordance with the present invention set forth in claim 3, in the multibeam antenna reception device according to claim 2, the path detection control section controls the path detection range at the current time for the respective M receive beam path detection sections based on the pairs of the receive beam numbers and the path delays detected prior to the current time and the information on the user signal reception quality in the respective pairs of the receive beam numbers and the path delays output from the M receive beam path detection sections so that the path detection range is confined or limited only to the vicinity of the respective pairs of the receive beam numbers and the path delays detected prior to the current time.

In accordance with the present invention set forth in claim 4, in the multibeam antenna reception device according to claim 3, when the path detection control section confines the path detection range only to the vicinity of the respective pairs of the receive beam numbers and the path delays detected prior to the current time, a combination of the receive beam number and the path delay is used as a condition for defining the vicinity.

In accordance with the present invention set forth in claim 5, in the multibeam antenna reception device according to claim 3, when the path detection control section confines the path detection range only to the vicinity of the respective pairs of the receive beam numbers and the path delays detected prior to the current time, ±S (S: an integer not more than the number of receive beams M) receive beam(s) adjacent to the pair is/are used as a condition for defining the vicinity.

In accordance with the present invention set forth in claim 6, in the multibeam antenna reception device according to claim 3, when the path detection control section confines the path detection range only to the vicinity of the respective pairs of the receive beam numbers and the path delays detected prior to the current time, a path delay of ±R (R: a real number not more than the maximum value of the path detection range) is used as a condition for defining the vicinity.

In accordance with the present invention set forth in claim 7, in the multibeam antenna reception device according to claim 3, when the path detection control section confines the path detection range only to the vicinity of the respective pairs of the receive beam numbers and the path delays detected prior to the current time, ±S (S: an integer not more than the number of receive beams M) receive beam(s) adjacent to the pair and a path delay of ±R (R: a real number not more than the maximum value of the path detection range) are used as a condition for defining the vicinity.

In accordance with the present invention set forth in claim 8, in the multibeam antenna reception device according to claim 2, the path detection control section controls the path detection range at the current time for the respective M receive beam path detection sections based on the pairs of the receive beam numbers and the path delays detected prior to the current time and the information on the user signal reception quality in the respective pairs of the receive beam numbers and the path delays output from the M receive beam path detection sections so that the path detection range is confined only to the vicinity of respective pairs of receive beam numbers and path delays at the current time calculated from the pairs of the receive beam numbers and the path delays detected prior to the current time and the information on the user signal reception quality in the respective pairs of the receive beam numbers and the path delays.

In accordance with the present invention set forth in claim 9, in the multibeam antenna reception device according to claim 8, when the path detection control section confines the path detection range only to the vicinity of the respective pairs of the receive beam numbers and the path delays at the current time calculated from the pairs of the receive beam numbers and the path delays detected prior to the current time and the information on the user signal reception quality in the respective pairs of the receive beam numbers and the path delays, a combination of the receive beam number and the path delay is used as a condition for defining the vicinity.

In accordance with the present invention set forth in claim 10, in the multibeam antenna reception device according to claim 8, when the path detection control section confines the path detection range only to the vicinity of the respective pairs of the receive beam numbers and the path delays at the current time calculated from the pairs of the receive beam numbers and the path delays detected prior to the current time and the information on the user signal reception quality in the respective pairs of the receive beam numbers and the path delays, ±S (S: an integer not more than the number of receive beams M) receive beam(s) adjacent to the pair is/are used as a condition for defining the vicinity.

In accordance with the present invention set forth in claim 11, in the multibeam antenna reception device according to claim 8, when the path detection control section confines the path detection range only to the vicinity of the respective pairs of the receive beam numbers and the path delays at the current time calculated from the pairs of the receive beam numbers and the path delays detected prior to the current time and the information on the user signal reception quality in the respective pairs of the receive beam numbers and the path delays, a path delay of ±R (R: a real number not more than the maximum value of the path detection range) is used as a condition for defining the vicinity.

In accordance with the present invention set forth in claim 12, in the multibeam antenna reception device according to claim 8, when the path detection control section confines the path detection range only to the vicinity of the respective pairs of the receive beam numbers and the path delays at the current time calculated from the pairs of the receive beam numbers and the path delays detected prior to the current time and the information on the user signal reception quality in the respective pairs of the receive beam numbers and the path delays, ±S (S: an integer not more than the number of receive beams M) receive beam(s) adjacent to the pair and a path delay of ±R (R: a real number not more than the maximum value of the path detection range) are used as a condition for defining the vicinity.

In accordance with the present invention set forth in claim 13, in the multibeam antenna reception device according to claim 2, when the path detection control section controls the path detection range at the current time for the respective M receive beam path detection sections based on the pairs of the receive beam numbers and the path delays detected prior to the current time and the information on the user signal reception quality in the respective pairs of the receive beam numbers and the path delays output from the M receive beam path detection sections, the path detection control section confines the path detection range using only one or more pairs of receive beam numbers and path delays detected prior to the current time, which are selected according to a certain standard, and information on user signal reception quality in the pairs of the receive beam numbers and the path delays.

In accordance with the present invention set forth in claim 14, in the multibeam antenna reception device according to claim 13, as the pair of the receive beam number and the path delay detected prior to the current time which is selected according to a certain standard, the top P (P: an integer not less than 1) pair(s) of (a) receive beam number(s) and (a) path delay(s) excellent in user signal reception quality is/are selected.

In accordance with the present invention set forth in claim 15, in the multibeam antenna reception device according to claim 13, as the pair of the receive beam number and the path delay detected prior to the current time which is selected according to a certain standard, at most Q (Q: an integer not less than 1) pair(s) of (a) receive beam number(s) and (a) path delay(s) in which the user signal reception quality meets a certain standard of reception quality is/are selected.

In accordance with the present invention set forth in claim 16, in the multibeam antenna reception device according to claim 13, as the pair of the receive beam number and the path delay detected prior to the current time which is selected according to a certain standard, the pair of the receive beam number and the path delay selected by the path delay/receive beam selection section is used.

In accordance with the present invention set forth in claim 17, in the multibeam antenna reception device according to claim 2, in the case where the path delay/receive beam selection section has selected no pair of a receive beam number and a path delay suitable for use in demodulation at the current time, the path detection control section sets the path detection range to cover all path delays and all receive beams.

In accordance with the present invention set forth in claim 18, in the multibeam antenna reception device according to claim 2, immediately after the initiation of reception, the path detection control section sets the path detection range to cover all path delays and all receive beams.

In accordance with the present invention set forth in claim 19, in the multibeam antenna reception device according to claim 2, the path detection control section sets the path detection range to cover all path delays and all receive beams periodically at intervals longer than the path detection interval.

In accordance with the present invention set forth in claim 20, in the multibeam antenna reception device according to one of claims 17 to 19, when the path detection control section sets the path detection range to cover all path delays and all receive beams, the resolution of the detection is reduced.

In accordance with the present invention set forth in claim 21, there is provided a multibeam reception method applied to a multibeam antenna transmission/reception device receiving at least one receive beam, comprising: a beam path detecting step for detecting path delay with respect to each user from the receive beam; a path detection range setting step for setting the path detection range based on pairs of receive beam numbers and path delays previously detected in the beam path detecting step and information on user signal reception quality in the respective pairs of the receive beam numbers and the path delays; a path selecting step for selecting one or more pairs of receive beam numbers and path delays for use in demodulation based on the pairs of the receive beam numbers and the path delays detected in the beam path detecting step, the information on the user signal reception quality in the respective pairs of the receive beam numbers and the path delays, and the path detection range set in the path detection range setting step; and a demodulating step for performing demodulation with the one or more pairs of the receive beam numbers and the path delays selected in the path selecting step.

In accordance with the present invention set forth in claim 22, in the multibeam reception method according to claim 21, in the path detection range setting step, the path detection range is set so that the path detection range is confined only to the vicinity of the respective pairs of the receive beam numbers and the path delays previously detected.

In accordance with the present invention set forth in claim 23, in the multibeam reception method according to claim 22, in the path detection range setting step, when the path detection range is confined only to the vicinity of the respective pairs of the receive beam numbers and the path delays previously detected, a combination of the receive beam number and the path delay is used as a condition for defining the vicinity.

In accordance with the present invention set forth in claim 24, in the multibeam reception method according to claim 22, in the path detection range setting step, when the path detection range is confined only to the vicinity of the respective pairs of the receive beam numbers and the path delays previously detected, at least one receive beam adjacent to the pair is used to define the vicinity.

In accordance with the present invention set forth in claim 25, in the multibeam reception method according to claim 22, in the path detection range setting step, when the path detection range is confined only to the vicinity of the respective pairs of the receive beam numbers and the path delays previously detected, at least one path delay in the maximum path detection range is used to define the vicinity.

In accordance with the present invention set forth in claim 26, in the multibeam reception method according to claim 22, in the path detection range setting step, when the path detection range is confined only to the vicinity of the respective pairs of the receive beam numbers and the path delays previously detected, at least one receive beam adjacent to the pair and at least one path delay in the maximum path detection range are used to define the vicinity.

In accordance with the present invention set forth in claim 27, in the multibeam reception method according to claim 21, in the path detection range setting step, the path detection range is set so that the path detection range is confined only to the vicinity of respective pairs of receive beam numbers and path delays calculated from the pairs of the receive beam numbers and the path delays previously detected and the information on the user signal reception quality in the respective pairs of the receive beam numbers and the path delays.

In accordance with the present invention set forth in claim 28, in the multibeam reception method according to claim 27, in the path detection range setting step, when the path detection range is confined only to the vicinity of the respective pairs of the receive beam numbers and the path delays calculated from the pairs of the receive beam numbers and the path delays previously detected and the information on the user signal reception quality in the respective pairs of the receive beam numbers and the path delays, a combination of the receive beam number and the path delay is used as a condition to define the vicinity.

In accordance with the present invention set forth in claim 29, in the multibeam reception method according to claim 27, in the path detection range setting step, when the path detection range is confined only to the vicinity of the respective pairs of the receive beam numbers and the path delays calculated from the pairs of the receive beam numbers and the path delays previously detected and the information on the user signal reception quality in the respective pairs of the receive beam numbers and the path delays, at least one receive beam adjacent to the pair is used to define the vicinity.

In accordance with the present invention set forth in claim 30, in the multibeam reception method according to claim 27, in the path detection range setting step, when the path detection range is confined only to the vicinity of the respective pairs of the receive beam numbers and the path delays calculated from the pairs of the receive beam numbers and the path delays previously detected and the information on the user signal reception quality in the respective pairs of the receive beam numbers and the path delays, at least one path delay in the maximum path detection range is used to define the vicinity.

In accordance with the present invention set forth in claim 31, in the multibeam reception method according to claim 27, in the path detection range setting step, when the path detection range is confined only to the vicinity of the respective pairs of the receive beam numbers and the path delays calculated from the pairs of the receive beam numbers and the path delays previously detected and the information on the user signal reception quality in the respective pairs of the receive beam numbers and the path delays, at least one receive beam adjacent to the pair and at least one path delay in the maximum path detection range are used to define the vicinity.

In accordance with the present invention set forth in claim 32, in the multibeam reception method according to claim 21, in the path detection range setting step, the path detection range is confined based on one or more pairs of receive beam numbers and path delays previously detected, which are selected according to a certain standard, and information on user signal reception quality in the pairs of the receive beam numbers and the path delays.

In accordance with the present invention set forth in claim 33, in the multibeam reception method according to claim 32, as the pair of the receive beam number and the path delay previously detected which is selected according to a certain standard, at least one pair of a receive beam number and a path delay excellent in user signal reception quality is selected.

In accordance with the present invention set forth in claim 34, in the multibeam reception method according to claim 32, as the pair of the receive beam number and the path delay previously detected which is selected according to a certain standard, at least one pair of a receive beam number and a path delay in which the user signal reception quality meets a certain standard of reception quality is selected.

In accordance with the present invention set forth in claim 35, in the multibeam reception method according to claim 21, in the case where no pair of a receive beam number and a path delay suitable for use in demodulation has been detected in the path selecting step, the path detection range is set to cover all path delays and all receive beams.

In accordance with the present invention set forth in claim 36, in the multibeam reception method according to claim 21, in the path selecting step, immediately after the initiation of reception, the path detection range is set to cover all path delays and all receive beams.

In accordance with the present invention set forth in claim 37, in the multibeam reception method according to claim 21, in the path selecting step, the path detection range is set to cover all path delays and all receive beams periodically at intervals longer than the path detection interval.

In accordance with the present invention set forth in claim 38, in the multibeam reception method according to one of claims 35 to 37, when the path detection range is set to cover all path delays and all receive beams, the resolution of the detection is reduced.

Incidentally, the reference numeral 101 represents a receiving array antenna. The reference numerals $102_1$ to $102_N$ and $202_1$ to $202_N$ represent receiving antenna elements. The reference numerals $103_1$ to $103_N$ and $203_1$ to $203_N$ represent antenna radio receiver sections. The reference numerals $104_1$ to $104_M$ and $204_1$ to $204_N$ represent receive beam forming sections. The reference numerals $105_1$ to $105_L$ and $205_1$ to $205_N$ represent user demodulation blocks. The reference numerals $106_1$ to $106_M$ and $206_1$ to $206_M$ represent receive beam path detection sections. The reference numerals 107 and 207 represent path delay/receive beam selection sections. The reference numeral 108 represents a path detection control section. The reference numerals 109 and 209 represent demodulation processing sections.

BEST MODE FOR CARRYING OUT THE INVENTION

[Summary of the Invention]

First, a brief summary of the present invention will be given referring to FIG. 2.

Figure 2:
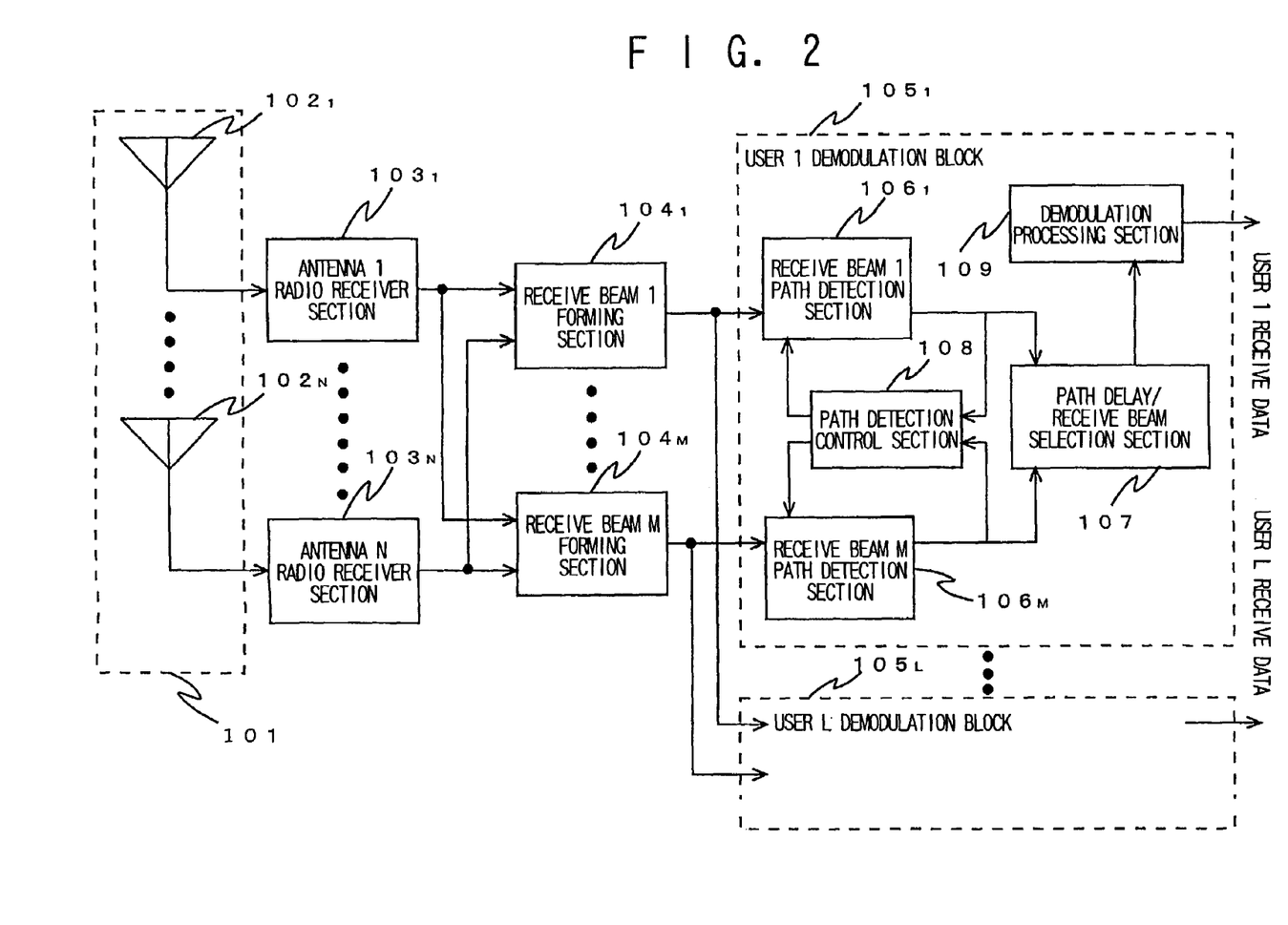
FIG. 2 is a block diagram showing an example of the construction of a multibeam antenna reception device according to the present invention.

As can be seen in FIG. 2, a multibeam antenna reception device of the present invention includes a path detection control section 108, and is characterized by controlling the path detection range based on information about path delays and receive beams detected prior to the current time when detecting the path of each user.

By virtue of this construction, the path detection range is defined so that an increase in the amount of computation can be suppressed even when the resolution of the path delay and the number of receive beam numbers are increased to improve the reception quality. Thus, there can be provided a multibeam antenna reception device capable of improving the reception quality while suppressing an increase in the amount of computation.

Referring now to the drawings, a description of a preferred embodiment of the present invention will be given in detail. Incidentally, in the description hereinbelow of a multibeam antenna reception device of this embodiment, L (L: an integer not less than one) indicates the number of users, N (N: an integer not less than one) indicates the number of receiving antenna elements, and M (M: an integer not less than one) indicates the number of receive beams.

In the following, the multibeam antenna reception device of this embodiment will be described referring to FIG. 2.

As shown in FIG. 2, the multibeam antenna reception device comprises: a receiving array antenna 101; antenna 1 to N radio receiver sections $103_1$ to $103_N$ corresponding to receiving antenna elements $102_1$ to $102_N$, respectively; receive beam 1 to M forming sections $104_1$ to $104_M$; and user 1 to L demodulation blocks $105_1$ to $105_L$.

The receiving array antenna 101 includes N pieces of the receiving antenna elements $102_1$ to $102_N$. The receiving array antenna 101 has no special limitation as to the directivity of the receiving antenna elements $102_1$ to $102_N$ as a unit in the horizontal plane and the vertical plane. The antenna element may be of, for example, omnidirectional (non-directional) or dipole (bidirectional) type. N pieces of the receiving antenna elements $102_1$ to $102_N$ are arranged in closely spaced relation so that signals received by the respective antenna elements correlate with one another.

Incidentally, the receiving array antenna 101 has no special limitation as to the number of the receiving antenna elements and the arrangement thereof so long as N pieces of the receiving antenna elements $102_1$ to $102_N$ are placed in the vicinity to each other. The receiving antenna elements may be arranged linearly or circularly with a spacing of one-half of the wavelength of the carrier frequency.

A signal received by each of N pieces of the receiving antenna elements $102_1$ to $102_N$ contains a desired user signal component, a plurality of interference signal components and thermal noise. In addition, a plurality of multipath components are present in the respective desired user signal component and interference signal components. Generally, these signal components arrive from different directions. That is, there exist plural pairs of receive beam numbers and desired user signal path delays.

Each of the antenna 1 to N radio receiver sections $103_1$ to $103_N$ comprises a low noise amplifier, a band-limiting filter, a mixer, a local oscillator, an AGC (Automatic Gain Controller), an quadrature detector, a low pass filter, an A/D (analog to digital) converter, and the like. Taking the antenna 1 radio receiver section $103_1$ as an example, the section $103_1$ receives as input the output of the receiving antenna element $102_1$. The antenna 1 radio receiver section $103_1$ performs amplification, frequency conversion from radio to baseband, quadrature detection, analog to digital conversion, etc. for the input signal, and thereafter, outputs the signal to the receive beam 1 to M forming sections $104_1$ to $104_M$.

The receive beam 1 to M forming sections $104_1$ to $104_M$ receive as input the output of the respective antenna 1 to N radio receiver sections $103_1$ to $103_N$. Each of the receive beam 1 to M forming sections $104_1$ to $104_M$ forms a different fixed receive beam for the input signal to output it to the user 1 to L demodulation blocks $105_1$ to $105_L$.

Incidentally, the receive beam 1 to M forming sections $104_1$ to $104_M$ have no special limitation as to the number and shape of the fixed receive beams as well as the method of forming the beams. In terms of shape, an orthogonal multibeam may be cited as an example of the fixed receive beam. Besides, as an example of the method of forming the fixed receive beam may be cited digital beam forming in which respective input signals are multiplied by a fixed complex beam weight by digital computation to obtain the sum thereof.

Further, in the multibeam antenna reception device of the present invention shown in FIG. 2, the receive beam 1 to M forming sections $104_1$ to $104_M$ are arranged in the position subsequent to the antenna 1 to N radio receiver sections $103_1$ to $103_N$, and create beams for digital signals in the baseband. However, beam forming may be performed in the radio band with a Butler matrix.

The receive beam 1 to M forming sections $104_1$ to $104_M$ form different fixed receive beams, respectively, for all input signals containing the user signal component and the user signal multipath components to separate the signals according to the directions from which they have arrived.

Each of the user 1 to L demodulation blocks $105_1$ to $105_L$ includes receive beam 1 to M path detection sections $106_1$ to $106_M$, a path delay/receive beam selection section 107, a path detection control section 108, and a demodulation processing section 109.

In the following, the user 1 to L demodulation blocks $105_1$ to $105_L$ will be described by taking one of them, the user demodulation blocks $105_1$, as an example.

The user demodulation blocks $105_1$ receives as input the output of the respective receive beam 1 to M forming sections $104_1$ to $104_M$, and outputs a user 1 transmission beam number and user 1 receive data.

The receive beam 1 to M path detection sections $106_1$ to $106_M$ receive as input the output of the receive beam 1 to M forming sections $104_1$ to $104_M$, respectively. Each of the receive beam 1 to M path detection sections $106_1$ to $106_M$ detects user 1 signal path delay with respect to each input signal to measure the reception quality of the user 1 signal in the path delay, thereby outputting the result to the path delay/receive beam selection section 107 and the path detection control section 108. At this point, each input signal has been multiplexed by user 1 to L signals and also by the multipath components of the respective user signals caused by propagation delay.

Incidentally, there is no special limitation on the method of multiplexing the user signal, and such signal multiplexing techniques as TDMA (Time Division Multiple Access) and CDMA (Code Division Multiple Access) may be applied. Further, there is no special limitation on the method of separating multiplexed user signals, the method of detecting the path delay of the multipath components, and the number of path delays to be detected. Still further, there is no special limitation on the index of the reception quality to be measured and the measurement method. Examples of the reception quality index include received power (including reception level, reception electric field strength or intensity, etc.) and SIR (Signal to Interference Ratio). In addition to SIR, indices represented by SINR (Signal to Interference plus Noise Ratio), SNR (Signal to Noise Ratio) and the like may be used.

Besides, the receive beam 1 to M path detection sections $106_1$ to $106_M$ may detect path delay and measure the reception quality of the user 1 signal in the path delay with only a known symbol (pilot symbol, etc.) of the user 1 signal.

The path delay/receive beam selection section 107 receives as input the output of the respective receive beam 1 to M path detection sections $106_1$ to $106_M$ including a pair of a receive beam number and a path delay, and information on user signal reception quality in the pair of the receive beam number and the path delay. Based on the user signal reception quality, the path delay/receive beam selection section 107 selects one or more pairs of receive beam numbers and path delays for use in demodulation, and outputs the selected pair(s) to the demodulation processing section 109.

A variety of methods may be applied to select a pair of a receive beam number and a path delay for use in demodulation without special limitations. For example, the top A (A: an integer not less than 1) pair(s) excellent in reception quality or at most B (B: an integer not less than 1) pair(s) meeting a certain standard of reception quality may be selected.

The path detection control section 108 receives as input the output of the respective receive beam 1 to M path detection sections $106_1$ to $106_M$ each corresponding to a receive beam, including a pair of a receive beam number and a path delay and information on user signal reception quality in the pair of the receive beam number and the path delay. Based on pairs of receive beam numbers and path delays detected prior to the current time and information on user signal reception quality in the pairs, the path detection control section 108 outputs as control information the path detection range at the current time for the respective receive beam 1 to M path detection sections 106₁ to 106_M to the path detection sections 106₁ to 106_M.

In order to control the path detection range at the current time for the respective receive beam 1 to M path detection sections 106₁ to 106_M, the path detection range may be confined or limited only to the vicinity of the respective pairs of the receive beam numbers and the path delays detected prior to the current time.

Additionally, in order to control the path detection range at the current time for the respective receive beam 1 to M path detection sections 106₁ to 106_M, the path detection range may also be confined only to the vicinity of respective pairs of receive beam numbers and path delays at the current time calculated from the pairs of the receive beam numbers and the path delays detected prior to the current time and the information on the user signal reception quality in the respective pairs of the receive beam numbers and the path delays.

In the case of confining the path detection range only to the vicinity of the respective pairs of the receive beam numbers and the path delays detected prior to the current time or to the vicinity of respective pairs of receive beam numbers and path delays at the current time calculated from the pairs of the receive beam numbers and the path delays detected prior to the current time and the information on the user signal reception quality in the pairs of the receive beam numbers and the path delays detected prior to the current time, a combination of the receive beam number and the path delay may be used as a condition for defining the vicinity.

Incidentally, there is no special limitation on the combination of the receive beam number and the path delay as a condition. As an example of the condition may be cited likelihood (probability) calculated from the information on the user signal reception quality in the pair of the receive beam number and the path delay. Besides, ±S (S: an integer not more than the number of receive beams M) receive beam(s) adjacent to the pair and a path delay of ±R (R: a real number not more than the maximum value of the path detection range) may be simply used as the condition.

Further, in the case of confining the path detection range only to the vicinity of the respective pairs of the receive beam numbers and the path delays detected prior to the current time or to the vicinity of respective pairs of receive beam numbers and path delays at the current time calculated from the pairs of the receive beam numbers and the path delays detected prior to the current time and the information on the user signal reception quality in the pairs of the receive beam numbers and the path delays detected prior to the current time, ±S (S: an integer not more than the number of receive beams M) receive beam(s) adjacent to the pair may be used as a condition for defining the vicinity.

Still further, in the case of confining the path detection range only to the vicinity of the respective pairs of the receive beam numbers and the path delays detected prior to the current time or to the vicinity of respective pairs of receive beam numbers and path delays at the current time calculated from the pairs of the receive beam numbers and the path delays detected prior to the current time and the information on the user signal reception quality in the pairs of the receive beam numbers and the path delays detected prior to the current time, a path delay of ±R (R: a real number not more than the maximum value of the path detection range) may be used as a condition for defining the vicinity.

As described above, the path detection control section 108 defines the path detection range at the current time for the respective receive beam 1 to M path detection sections 106₁ to 106_M based on the pairs of the receive beam numbers and the path delays detected prior to the current time and the information on the user signal reception quality in the pairs. On this occasion, the path detection range may be defined by only one or more pairs of receive beam numbers and path delays detected prior to the current time, which are selected according to a certain standard, and information on user signal reception quality in the pair(s) to simplify the computation.

As the pair of the receive beam number and the path delay detected prior to the current time which is selected according to a certain standard, the top P (P: an integer not less than 1) pair(s) of (a) receive beam number(s) and (a) path delay(s) excellent in user signal reception quality may be selected.

Further, as the pair of the receive beam number and the path delay detected prior to the current time which is selected according to a certain standard, at most Q (Q: an integer not less than 1) pair(s) of (a) receive beam number(s) and (a) path delay(s) in which user signal reception quality meets a certain standard of reception quality may be selected.

Still further, as the pair of the receive beam number and the path delay detected prior to the current time which is selected according to a certain standard, the pair of the receive beam number and the path delay selected by the path delay/receive beam selection section 107 may be employed.

In this manner, by inputting information on the one or more receive beam numbers and the path delays for use in demodulation output from the path delay/receive beam selection section 107 to the path detection control section 108, or by providing the path detection control section 108 with functions equivalent to those of the path delay/receive beam selection section 107, the path detection range can be confined only to the vicinity of the pair(s) of the receive beam number(s) and the path delay(s) for use in demodulation.

Figure 3:
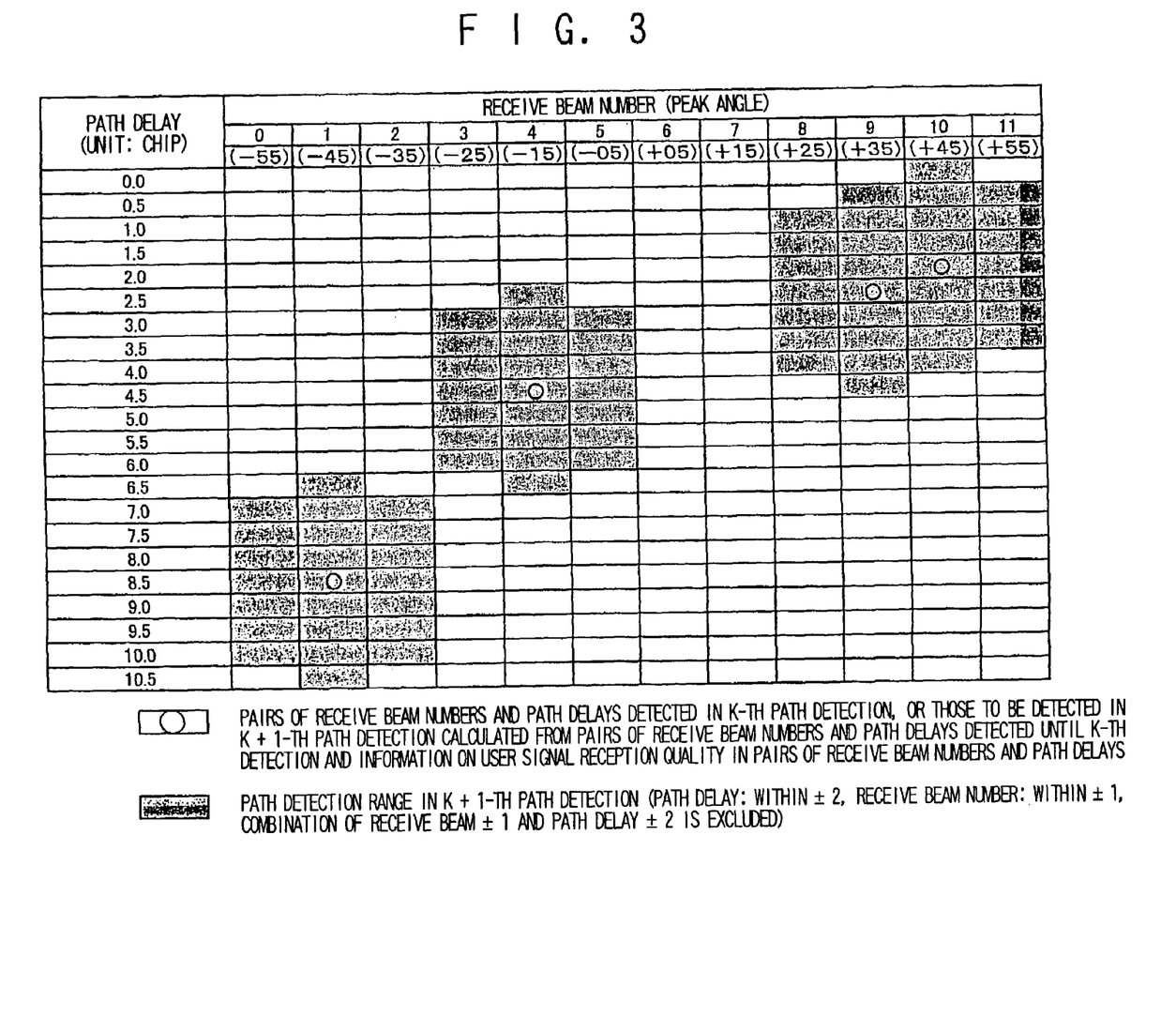
FIG. 3 is a diagram illustrating an example of the operation of a path detection control section 108 for normal scanning according to the present invention.

FIG. 3 is a diagram illustrating an example of the operation of the path detection control section 108 for normal scanning.

As can be seen in FIG. 3, there are 12 receive beams at angles from −55° to +55° at intervals of 10°, and there are 22 path delay timings of 0.0 to 10.5 chip. In FIG. 3, four sections with a circle "○" indicate pairs of receive beam numbers and path delays detected in the k-th (k: an integer not less than 1) path detection, or those to be detected in the k+1-th path detection calculated from pairs of receive beam numbers and path delays detected until the k-th detection and the information on user signal reception quality in the pairs of the receive beam numbers and the path delays. In addition, colored sections indicate the path detection range in the k+1-th path detection.

In the example of FIG. 3, the path detection range is defined on the condition that "the path delay be within ±2 (R=2) and the receive beam number be within ±1 (S=1), but a combination of a receive beam ±1 and path delay ±2 be excluded). By defining the path detection range in this manner, an increase in the amount of computation can be suppressed even if the resolution of the path delay and the number of receive beam numbers are increased to improve the reception quality.

Incidentally, in the case where the path delay/receive beam selection section 107 cannot select a pair of a receive beam number and a path delay for use in demodulation at the current time, the path detection range is set to cover all path delays and all receive beams, and the detection is performed again in the path detection control section 108.

In the path detection control section 108, the path detection range is also set to cover all path delays and all receive beams immediately after the initiation of reception.

Besides, in the path detection control section 108, the path detection range is periodically set to cover all path delays and all receive beams to perform the redetection at intervals longer than the path detection interval. Thereby, it is possible to detect a new path that appears regardless of pairs of previous path delays and receive beam numbers. That is, since a new path may appear, if not frequently, regardless of pairs of previous path delays and receive beam numbers, the entire path detection range is scanned on a regular basis.

If the resolution of the detection is reduced when the path detection range is set to cover all path delays and all receive beams, an increase in the amount of computation can be suppressed.

Even though detection accuracy deteriorates to some degree, once a path is detected, highly accurate detection (normal scanning) is performed thereafter. Accordingly, the reception quality will hardly deteriorate due to a decrease in the resolution of the detection.

Incidentally, there is no special limitation on the method of lowering the resolution of the detection. For example, intervals between path delays as well as receive beam numbers to be scanned may be increased as compared to those in normal scanning.

Figure 4:
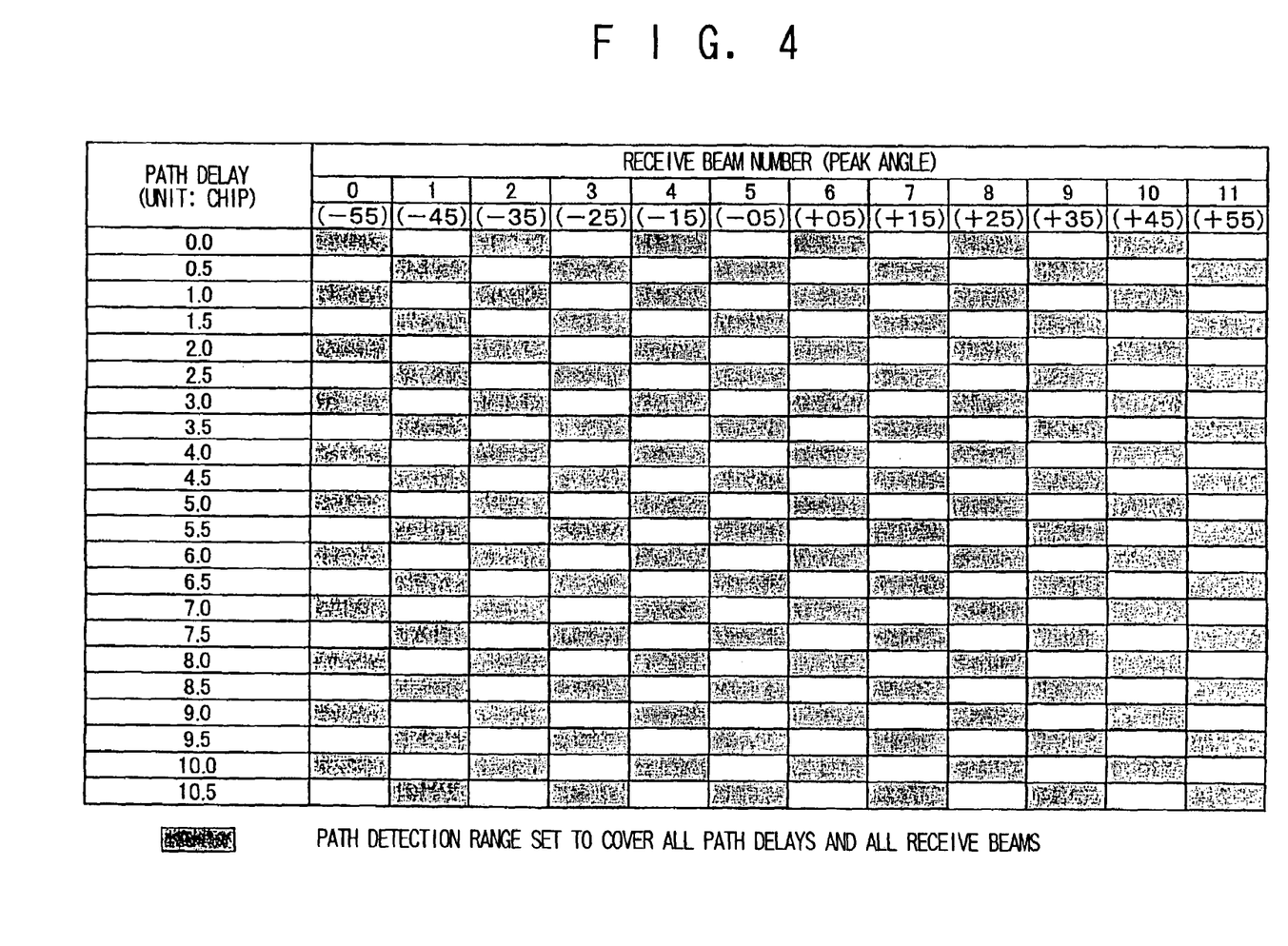
FIG. 4 is a diagram illustrating an example of the operation of a path detection control section 108 for setting the path detection range covering all path delays and all receive beams according to the present invention.

FIG. 4 is a diagram illustrating an example of the operation of the path detection control section 108 for setting the path detection range covering all path delays and all receive beams.

As can be seen in FIG. 4, there are 12 receive beams at angles from −55° to +55° at intervals of 10°, and there are 22 path delay timings of 0.0 to 10.5 chip. Additionally, colored sections indicate the path detection range set to cover all path delays and all receive beams. In the example of FIG. 4, the path detection range is defined on a grid. Thus, an increase in the amount of computation can be suppressed even when the resolution of the path delay and the number of receive beam numbers are increased to improve the reception quality.

The demodulation processing section 109 receives as input the one or more pairs of the receive beam numbers and the path delays and the information on the user signal reception quality in the pairs of the receive beam numbers and the path delays output from the path delay/receive beam selection section 107. The demodulation processing section 109 performs demodulation based on the input receive beam number(s) and the path delay(s) to output the user 1 receive data.

As is described above, in accordance with the present invention, when detecting the path of each user, the multibeam antenna reception device controls the path detection range based on information as to receive beams and path delays detected prior to the current time. Thus, the path detection range can be defined or limited without a deterioration in reception characteristics. As a consequence, the amount of computation can be reduced.

While the present invention has been illustrated by one preferred embodiment, it is not so limited but is susceptible of various changes and modifications without departing from the scope and spirit of the present invention. For example, in the multibeam antenna reception device of the present invention, there is no special limitation on the radio transmission/demodulation method. Besides, there is no special limitation on the number of the receiving antenna elements. Further, there is no special limitation on the construction of the radio receiver section. Still further, there is no special limitation on the construction of the demodulation processing section. Still further, there is no special limitation on the number of users from whom the multibeam antenna reception device can receive data at the same time. Still further, there is no special limitation on the number of the multipaths of users from whom the multibeam antenna reception device can receive data at the same time.

Although the above embodiment has been described with respect to reception only, it is also possible to transmit data in the directions of receive beam numbers selected according to the present invention.

In addition, the multibeam antenna reception device of the present invention is applicable to base stations or mobile stations forming a mobile communication system.

INDUSTRIAL APPLICABILITY

As set forth hereinabove, in accordance with the present invention, when detecting the path of each user, the multibeam antenna reception device controls the path detection range based on information on receive beams and path delays detected prior to the current time. Consequently, the path detection range is limited and an increase in the amount of computation can be suppressed even when the resolution of the path delay and the number of receive beam numbers are increased to improve the reception quality. Thus, it becomes possible to improve the reception quality while suppressing an increase in the amount of computation.

The invention claimed is:

1. A multibeam antenna reception device comprising:
   a receiving array antenna including N receiving antenna elements, wherein N is an integer not less than 1;
   N radio receiver sections corresponding to the receiving antenna elements, respectively;
   M receive beam forming sections, wherein M is an integer not less than 1; and
   L user demodulation blocks, wherein L is an integer not less than 1;
   wherein, detection of a path is defined by a receive beam number as an arrival direction and a path delay as arrival timing with respect to the multipath of each user, and a path detection range at a current time is controlled based on paths information detected prior to the current time.

2. The multibeam antenna reception device according to claim 1, wherein each of the user demodulation blocks includes:
   M receive beam path detection sections for detecting path delay with respect to each user from the outputs of the M receive beam forming sections;
   a path delay/receive beam selection section for selecting one or more pairs of receive beam numbers and path delays for use in demodulation based on pairs of receive beam numbers and path delays and information on user signal reception quality in the respective pairs of the receive beam numbers and the path delays output from the M receive beam path detection sections;
   a demodulation processing section for performing demodulation with the one or more pairs of the receive beam numbers and the path delays selected by the path delay/receive beam selection section; and a path detection control section for controlling the path detection range at the current time for the respective M receive beam path detection sections based on pairs of receive beam numbers and path delays detected prior to the current time and information on user signal reception quality in the respective pairs of the receive beam numbers and the path delays output from the M receive beam path detection sections.

3. The multibeam antenna reception device according to claim 2, wherein the path detection control section controls the path detection range at the current time for the respective M receive beam path detection sections based on the pairs of the receive beam numbers and the path delays detected prior to the current time and the information on the user signal reception quality in the respective pairs of the receive beam numbers and the path delays output from the M receive beam path detection sections so that the path detection range is confined only to the vicinity of the respective pairs of the receive beam numbers and the path delays detected prior to the current time.

4. The multibeam antenna reception device according to claim 3, wherein, when the path detection control section confines the path detection range only to the vicinity of the respective pairs of the receive beam numbers and the path delays detected prior to the current time, a combination of the receive beam number and the path delay is used as a condition for defining the vicinity.

5. The multibeam antenna reception device according to claim 3, wherein, when the path detection control section confines the path detection range only to the vicinity of the respective pairs of the receive beam numbers and the path delays detected prior to the current time, ±S receive beams adjacent to the pair are used as a condition for defining the vicinity, wherein S is an integer not more than the number of receive beams M.

6. The multibeam antenna reception device according to claim 3, wherein, when the path detection control section confines the path detection range only to the vicinity of the respective pairs of the receive beam numbers and the path delays detected prior to the current time, a path delay of ±R is used as a condition for defining the vicinity, wherein R is a real number not more than the maximum value of the path detection range.

7. The multibeam antenna reception device according to claim 3, wherein, when the path detection control section confines the path detection range only to the vicinity of the respective pairs of the receive beam numbers and the path delays detected prior to the current time, ±S receive beams adjacent to the pair and a path delay of ±R are used as a condition for defining the vicinity, wherein S is an integer not more than the number of receive beams M and R is a real number not more than the maximum value of the path detection range.

8. The multibeam antenna reception device according to claim 2, wherein the path detection control section controls the path detection range at the current time for the respective M receive beam path detection sections based on the pairs of the receive beam numbers and the path delays detected prior to the current time and the information on the user signal reception quality in the respective pairs of the receive beam numbers and the path delays output from the M receive beam path detection sections so that the path detection range is confined only to the vicinity of respective pairs of receive beam numbers and path delays at the current time calculated from the pairs of the receive beam numbers and the path delays detected prior to the current time and the information on the user signal reception quality in the respective pairs of the receive beam numbers and the path delays.

9. The multibeam antenna reception device according to claim 8, wherein, when the path detection control section confines the path detection range only to the vicinity of the respective pairs of the receive beam numbers and the path delays at the current time calculated from the pairs of the receive beam numbers and the path delays detected prior to the current time and the information on the user signal reception quality in the respective pairs of the receive beam numbers and the path delays, a combination of the receive beam number and the path delay is used as a condition for defining the vicinity.

10. The multibeam antenna reception device according to claim 8, wherein, when the path detection control section confines the path detection range only to the vicinity of the respective pairs of the receive beam numbers and the path delays at the current time calculated from the pairs of the receive beam numbers and the path delays detected prior to the current time and the information on the user signal reception quality in the respective pairs of the receive beam numbers and the path delays, ±S receive beams adjacent to the pair are used as a condition for defining the vicinity, wherein S is an integer not more than the number of receive beams M.

11. The multibeam antenna reception device according to claim 8, wherein, when the path detection control section confines the path detection range only to the vicinity of the respective pairs of the receive beam numbers and the path delays at the current time calculated from the pairs of the receive beam numbers and the path delays detected prior to the current time and the information on the user signal reception quality in the respective pairs of the receive beam numbers and the path delays, a path delay of ±R is used as a condition for defining the vicinity, wherein R is a real number not more than the maximum value of the path detection range.

12. The multibeam antenna reception device according to claim 8, wherein, when the path detection control section confines the path detection range only to the vicinity of the respective pairs of the receive beam numbers and the path delays at the current time calculated from the pairs of the receive beam numbers and the path delays detected prior to the current time and the information on the user signal reception quality in the respective pairs of the receive beam numbers and the path delays, ±S receive beams adjacent to the pair and a path delay of ±R are used as a condition for defining the vicinity, wherein S is an integer not more than the number of receive beams M and R is a real number not more than the maximum value of the path detection range.

13. The multibeam antenna reception device according to claim 2, wherein, when the path detection control section controls the path detection range at the current time for the respective M receive beam path detection sections based on the pairs of the receive beam numbers and the path delays detected prior to the current time and the information on the user signal reception quality in the respective pairs of the receive beam numbers and the path delays output from the M receive beam path detection sections, the path detection control section confines the path detection range using only one or more pairs of receive beam numbers and path delays detected prior to the current time, which are selected according to a certain standard, and information on user signal reception quality in the pairs of the receive beam numbers and the path delays.

14. The multibeam antenna reception device according to claim 13, wherein, as the pair of the receive beam number and the path delay detected prior to the current time which is selected according to a certain standard, the top P pairs of receive beam numbers and path delays excellent in user signal reception quality are selected, wherein P is an integer not less than 1.

15. The multibeam antenna reception device according to claim 13, wherein, as the pair of the receive beam number and the path delay detected prior to the current time which is selected according to a certain standard, at most Q pairs of receive beam numbers and path delays in which the user signal reception quality meets a certain standard of reception quality are selected, wherein Q is an integer not less than 1.

16. The multibeam antenna reception device according to claim 13, wherein, as the pair of the receive beam number and the path delay detected prior to the current time which is selected according to a certain standard, the pair of the receive beam number and the path delay selected by the path delay!receive beam selection section is used.

17. The multibeam antenna reception device according to claim 2, wherein, in the case where the path delay!receive beam selection section has selected no pair of a receive beam number and a path delay suitable for use in demodulation at the current time, the path detection control section sets the path detection range to cover all path delays and all receive beams.

18. The multibeam antenna reception device according to claim 2, wherein, immediately after the initiation of reception, the path detection control section sets the path detection range to cover all path delays and all receive beams.

19. The multibeam antenna reception device according to claim 2, wherein the path detection control section sets the path detection range to cover all path delays and all receive beams periodically at intervals longer than the path detection interval.

20. The multibeam antenna reception device according to claim 17, wherein, when the path detection control section sets the path detection range to cover all path delays and all receive beams, the resolution of the detection is reduced.

21. A multibeam reception method applied to a multibeam antenna transmission/reception device receiving at least one receive beam, comprising:
 a beam path detecting step for detecting path delay with respect to each user from the receive beam;
 a path detection range setting step for setting the path detection range based on pairs of receive beam numbers and path delays previously detected in the beam path detecting step and information on user signal reception quality in the respective pairs of the receive beam numbers and the path delays;
 a path selecting step for selecting one or more pairs of receive beam numbers and path delays for use in demodulation based on the pairs of the receive beam numbers and the path delays detected in the beam path detecting step, the information on the user signal reception quality in the respective pairs of the receive beam numbers and the path delays, and the path detection range set in the path detection range setting step; and
 a demodulating step for performing demodulation with the one or more pairs of the receive beam numbers and the path delays selected in the path selecting step.

22. The multibeam reception method according to claim 21, wherein, in the path detection range setting step, the path detection range is set so that the path detection range is confined only to the vicinity of the respective pairs of the receive beam numbers and the path delays previously detected.

23. The multibeam reception method according to claim 22, wherein, in the path detection range setting step, when the path detection range is confined only to the vicinity of the respective pairs of the receive beam numbers and the path delays previously detected, a combination of the receive beam number and the path delay is used as a condition for defining the vicinity.

24. The multibeam reception method according to claim 22, wherein, in the path detection range setting step, when the path detection range is confined only to the vicinity of the respective pairs of the receive beam numbers and the path delays previously detected, at least one receive beam adjacent to the pair is used to define the vicinity.

25. The multibeam reception method according to claim 22, wherein, in the path detection range setting step, when the path detection range is confined only to the vicinity of the respective pairs of the receive beam numbers and the path delays previously detected, at least one path delay in the maximum path detection range is used to define the vicinity.

26. The multibeam reception method according to claim 22, wherein, in the path detection range setting step, when the path detection range is confined only to the vicinity of the respective pairs of the receive beam numbers and the path delays previously detected, at least one receive beam adjacent to the pair and at least one path delay in the maximum path detection range are used to define the vicinity.

27. The multibeam reception method according to claim 21, wherein, in the path detection range setting step, the path detection range is set so that the path detection range is confined only to the vicinity of respective pairs of receive beam numbers and path delays calculated from the pairs of the receive beam numbers and the path delays previously detected and the information on the user signal reception quality in the respective pairs of the receive beam numbers and the path delays.

28. The multibeam reception method according to claim 27, wherein, in the path detection range setting step, when the path detection range is confined only to the vicinity of the respective pairs of the receive beam numbers and the path delays calculated from the pairs of the receive beam numbers and the path delays previously detected and the information on the user signal reception quality in the respective pairs of the receive beam numbers and the path delays, a combination of the receive beam number and the path delay is used as a condition to define the vicinity.

29. The multibeam reception method according to claim 27, wherein, in the path detection range setting step, when the path detection range is confined only to the vicinity of the respective pairs of the receive beam numbers and the path delays calculated from the pairs of the receive beam numbers and the path delays previously detected and the information on the user signal reception quality in the respective pairs of the receive beam numbers and the path delays, at least one receive beam adjacent to the pair is used to define the vicinity.

30. The multibeam reception method according to claim 27, wherein, in the path detection range setting step, when the path detection range is confined only to the vicinity of the respective pairs of the receive beam numbers and the path delays calculated from the pairs of the receive beam numbers and the path delays previously detected and the information on the user signal reception quality in the respective pairs of the receive beam numbers and the path delays, at least one path delay in the maximum path detection range is used to define the vicinity.

31. The multibeam reception method according to claim 27, wherein, in the path detection range setting step, when the path detection range is confined only to the vicinity of the respective pairs of the receive beam numbers and the path delays calculated from the pairs of the receive beam numbers and the path delays previously detected and the information on the user signal reception quality in the respective pairs of the receive beam numbers and the path delays, at least one receive beam adjacent to the pair and at least one path delay in the maximum path detection range are used to define the vicinity.

32. The multibeam reception method according to claim 21, wherein, in the path detection range setting step, the path detection range is confined based on one or more pairs of receive beam numbers and path delays previously detected, which are selected according to a certain standard, and information on user signal reception quality in the pairs of the receive beam numbers and the path delays.

33. The multibeam reception method according to claim 32, wherein, as the pair of the receive beam number and the path delay previously detected which is selected according to a certain standard, at least one pair of a receive beam number and a path delay excellent in user signal reception quality is selected.

34. The multibeam reception method according to claim 32, wherein, as the pair of the receive beam number and the path delay previously detected which is selected according to a certain standard, at least one pair of a receive beam number and a path delay in which the user signal reception quality meets a certain standard of reception quality is selected.

35. The multibeam reception method according to claim 21, wherein, in the case where no pair of a receive beam number and a path delay suitable for use in demodulation has been detected in the path selecting step, the path detection range is set to cover all path delays and all receive beams.

36. The multibeam reception method according to claim 21, wherein, in the path selecting step, immediately after the initiation of reception, the path detection range is set to cover all path delays and all receive beams.

37. The multibeam reception method according to claim 21, wherein, in the path selecting step, the path detection range is set to cover all path delays and all receive beams periodically at intervals longer than the path detection interval.

38. The multibeam reception method according to claim 35, wherein, when the path detection range is set to cover all path delays and all receive beams, the resolution of the detection is reduced.

* * * * *